United States Patent Office.

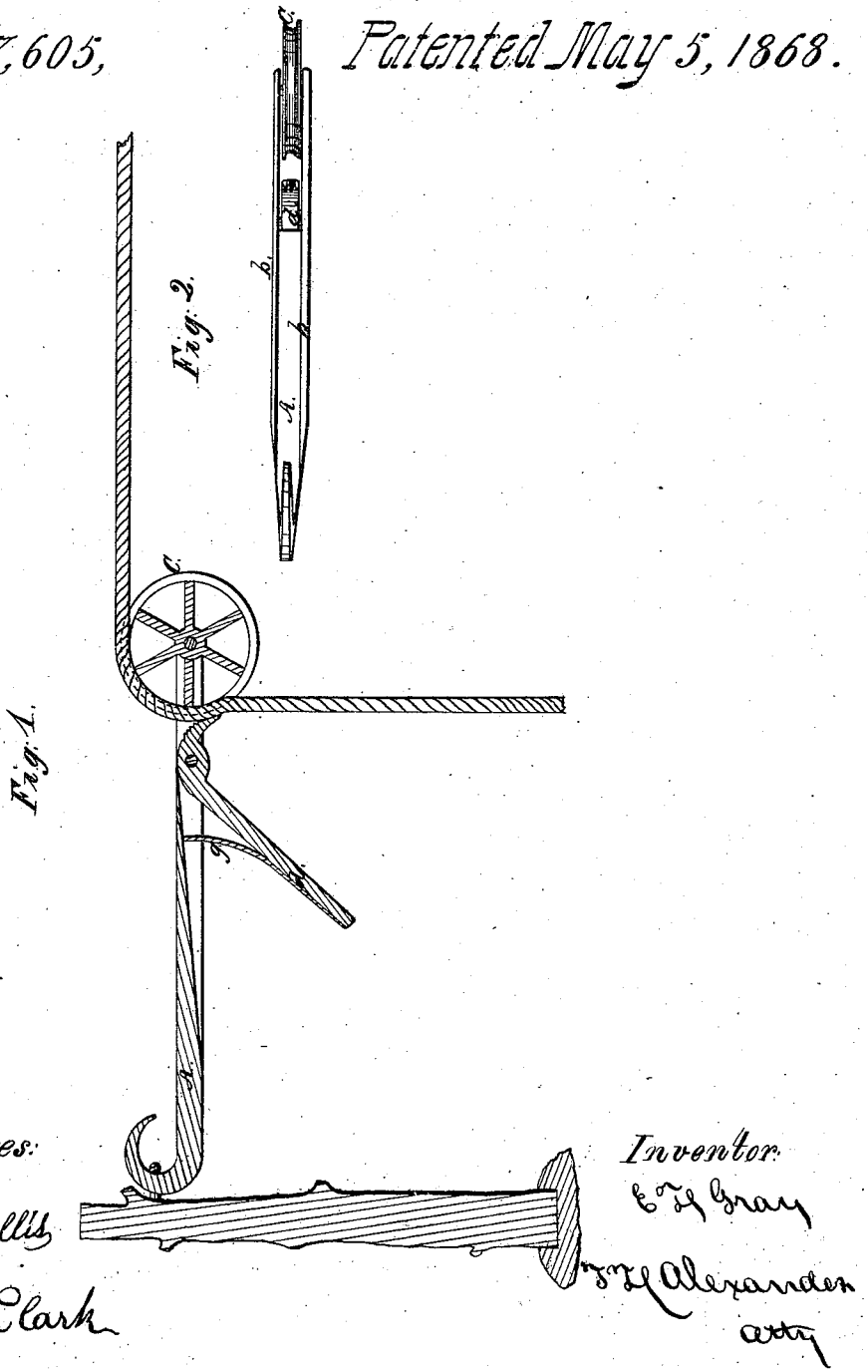

ELIJAH H. GRAY, OF WINCHESTER, ILLINOIS.

Letters Patent No. 77,605, dated May 5, 1868.

IMPROVED CLOTHES-LINE HOOK.

*The Schedule referred to in these Letters Patent and making part of the same.*

TO ALL WHOM IT MAY CONCERN:

Be it known that I, ELIJAH H. GRAY, of Winchester, in the county of Scott, and State of Illinois, have invented certain new and useful Improvements in Clothes-Line Hooks; and I do hereby declare that the following is a full, clear, and exact description thereof, reference being had to the accompanying drawings, and to the letters of reference marked thereon, which form a part of this specification, in which—

Figure 1 is a longitudinal section, and

Figure 2 a top view.

The object of this invention is to furnish a convenient device for holding and tightening clothes-lines, and the nature of it consists in the novel arrangement of such mechanical contrivances as will be hereinafter described.

To enable others skilled in the art to make and use it, I will proceed to describe its construction and operation.

A represents a bar of metal, with a hook formed at one end. The under side of this bar, towards its opposite end, should be inclined or bevelled, as seen in fig. 1, the object of which will be more apparent hereafter.

$b\ b$ are jaws, riveted at each side of bar A. Between the outer ends of these jaws is the pulley C.

$d$ represents a cam-lever, provided with spring $g$. The upper end of this spring slides on the inclined side of bar A, as fully shown in fig. 1. The lever $d$ is pivoted between the jaws $b\ b$, sufficiently near to the pulley, that, when it is pressed down, the cord D will be securely held between them; and in order more thoroughly to prevent the cord from slipping, the end of the lever is serrated.

In using my invention, I pass the hook through a staple, or anything that will hold it. I then run one end of the cord between the lever and pulley, and when it is drawn sufficiently tight, the lever is brought down in position, which will retain it at any desired tension.

What I claim as new, and desire to secure by Letters Patent, is—

The hook A, provided with jaws $b\ b$, in combination with cam-lever $d$, spring $g$, and pulley C, all arranged substantially as set forth.

In testimony that I claim the foregoing as my own, I affix my signature in presence of two witnesses.

ELIJAH H. GRAY.

Witnesses:
S. P. BROWN,
W. W. CHAPMAN.